United States Patent
Brunone

(10) Patent No.: US 10,822,186 B2
(45) Date of Patent: Nov. 3, 2020

(54) BELT CONVEYOR MAINTENANCE PROCESS AND DEVICE, CORRESPONDING ASSEMBLY

(71) Applicant: René Brunone, Saint-Marcel (FR)

(72) Inventor: René Brunone, Saint-Marcel (FR)

( * ) Notice: Subject to any disclaimer, the term of this patent is extended or adjusted under 35 U.S.C. 154(b) by 0 days.

(21) Appl. No.: 16/517,412

(22) Filed: Jul. 19, 2019

(65) Prior Publication Data

US 2020/0024089 A1    Jan. 23, 2020

(30) Foreign Application Priority Data

Jul. 20, 2018  (FR) ..................................... 18 56765

(51) Int. Cl.
| | | |
|---|---|---|
| *B65G 15/64* | (2006.01) | |
| *B65G 15/60* | (2006.01) | |
| *B65G 69/20* | (2006.01) | |

(52) U.S. Cl.
CPC ............. *B65G 69/20* (2013.01); *B65G 15/60* (2013.01)

(58) Field of Classification Search
None
See application file for complete search history.

(56) References Cited

U.S. PATENT DOCUMENTS

| 6,062,377 | A | * | 5/2000 | Mensch | ................. | B65G 15/60 |
| | | | | | | 198/811 |
| 6,109,428 | A | * | 8/2000 | Harm | ..................... | B65G 15/60 |
| | | | | | | 198/841 |
| 6,491,156 | B1 | * | 12/2002 | Hudson | .................. | B65G 15/60 |
| | | | | | | 198/811 |
| 8,186,651 | B2 | * | 5/2012 | Dowling | ................ | B65G 15/00 |
| | | | | | | 254/133 R |
| 9,056,755 | B1 | | 6/2015 | Moy | | |
| 9,428,372 | B2 | * | 8/2016 | Arif | ....................... | B65G 45/00 |

FOREIGN PATENT DOCUMENTS

| FR | 2658495 A1 | 8/1991 |
| WO | 2009/122230 A2 | 10/2009 |

OTHER PUBLICATIONS

French Search Report for Application No. 1856765, dated Mar. 12, 2019 in 2 pages.

* cited by examiner

*Primary Examiner* — Kavel Singh
(74) *Attorney, Agent, or Firm* — Knobbe, Martens, Olson & Bear, LLP

(57) ABSTRACT

A process is for the maintenance of a belt conveyor, which includes a longitudinal conveyor belt and a number of support stations for the conveyor belt distributed along the conveyor belt. Each support station includes a cradle on which the conveyor belt rests. The process includes inserting an inflatable pad in a deflated state below the conveyor belt, in a lifting position near one of the support stations, inflating the inflatable pad to an inflated state in which the conveyor belt rests directly on the inflatable pad and no longer rests on the cradle of the support station, performing a maintenance operation on the support station, and deflating the inflatable pad to its deflated state.

13 Claims, 5 Drawing Sheets

BELT CONVEYOR MAINTENANCE PROCESS AND DEVICE, CORRESPONDING ASSEMBLY

CROSS-REFERENCE TO RELATED APPLICATION

This application claims priority to French Patent Application No. 18 56765 filed on Jul. 20, 2018, the disclosure of which including the specification, the drawings, and the claims is hereby incorporated by reference in its entirety.

FIELD OF THE INVENTION

The invention generally relates to the conveyor belt maintenance.

BACKGROUND OF THE INVENTION

Such belt conveyors typically comprise a longitudinal conveyor belt and a plurality of support stations for the conveyor belt, distributed along the belt.

Each support station includes a cradle, formed by one or several support members.

The conveyor belt rests on the support members, which give it a determined shape, typically in a deep trough.

The support members are typically rollers or pads.

It is necessary to replace the support members periodically, which are worn out by the contact with the belt.

Such an operation is not very convenient, since the operator must lift the belt to disassemble the support members and separate them from the chassis.

SUMMARY OF THE INVENTION

In this context, the invention aims to facilitate the maintenance of the belt conveyor.

According to a first aspect, the invention relates to a belt conveyor maintenance process comprising a longitudinal conveyor belt and a plurality of support stations for the conveyor belt distributed along the conveyor belt, each support station comprising a cradle on which the conveyor belt rests, the process comprising the following steps:

- inserting an inflatable pad in a deflated state below the conveyor belt, in a lifting position near one of the support stations;
- inflating the inflatable pad to an inflated state in which the conveyor belt rests directly on the inflatable pad and no longer rests on the cradle of said support station;
- performing a maintenance operation on said support station;
- deflating the inflatable pad to its deflated state.

Thus, the inflatable pad makes it possible to lift the belt above the support station in which the maintenance operation must be performed.

The operator can therefore intervene easily on the support station, in particular to replace one of the support members of the belt. The inflatable pad forms a sort of inflatable jack.

Using an inflatable pad makes it possible to shim the belt stably, in a position where it no longer has any contact with the support station.

The lifting of the belt is therefore obtained easily, without requiring the implementation of a sophisticated mechanical system.

The inflatable pad can be moved easily along the conveyor belt, to provide maintenance at different points of the conveyor.

The process is cost-effective, since it only requires the implementation of simple and inexpensive means.

The maintenance process can further represent one or several of the features below, considered individually or according to all technically possible combinations:

- the cradle comprises several support members of the conveyor belt, the maintenance operation comprising the replacement of at least one of the support members;
- the conveyor belt rests on the cradle of said support station by a support surface, said support surface having, in cross-section, a determined shape when the conveyor belt rests on the cradle of said support station, the inflatable pad having a bearing surface provided to bear against the conveyor belt in the inflated state, said bearing surface having, in the inflated state, in the absence of any stress, said determined section;
- the inflatable pad is inflated by a fan;
- the inflatable pad and the fan are mounted on a chassis and thus form a single-piece portable subassembly;
- the inflatable pad, in the inflated state, has a pressure of between 1 absolute bar and 3 absolute bars;
- the conveyor belt comprises a conveyor chassis, the inflatable pad being mounted on the conveyor chassis in the lifting position.

According to a second aspect, the invention relates to a belt conveyor maintenance device comprising a longitudinal conveyor belt and a plurality of support stations for the conveyor belt distributed along the conveyor belt, each support station comprising a cradle on which the conveyor belt rests, the device comprising:

- an inflatable pad capable of selectively adopting a deflated state and an inflated state;
- an inflation member, arranged so as to inflate the inflatable pad to its inflated state; the inflatable pad being configured in order, in the inflated state, to be inserted below the conveyor belt in a lifting position near one of the support stations;
- the inflatable pad being configured in order, in the lifting position and in the inflated state, to lift the conveyor belt such that the conveyor belt rests directly on the inflatable pad and no longer rests on the cradle of said support station.

The maintenance device can further represent one or several of the features below, considered individually or according to all technically possible combinations:

- the conveyor belt rests on the cradle of said support station by a support surface, said support surface having, in cross-section, a determined shape when the conveyor belt rests on the cradle of said support station, the inflatable pad having a bearing surface provided to bear against the conveyor belt in the inflated state, said bearing surface having, in the inflated state, in the absence of any stress, said determined section;
- the maintenance device comprises a chassis on which the inflatable pad and the inflation member are mounted, thus forming a single-piece portable subassembly.

According to a third aspect, the invention relates to an assembly comprising:

- a belt conveyor comprising a longitudinal conveyor belt and a plurality of support stations for the conveyor belt distributed along the conveyor belt, each support station comprising a cradle on which the conveyor belt rests; and
- a maintenance device of the belt conveyor having the above characteristics.

BRIEF DESCRIPTION OF THE DRAWINGS

Other features or advantages of the invention will emerge from the detailed description given below, by way of indication and without limitation, with reference to the annexed figures, including.

DETAILED DESCRIPTION OF THE PREFERRED EMBODIMENTS

Figure 1:
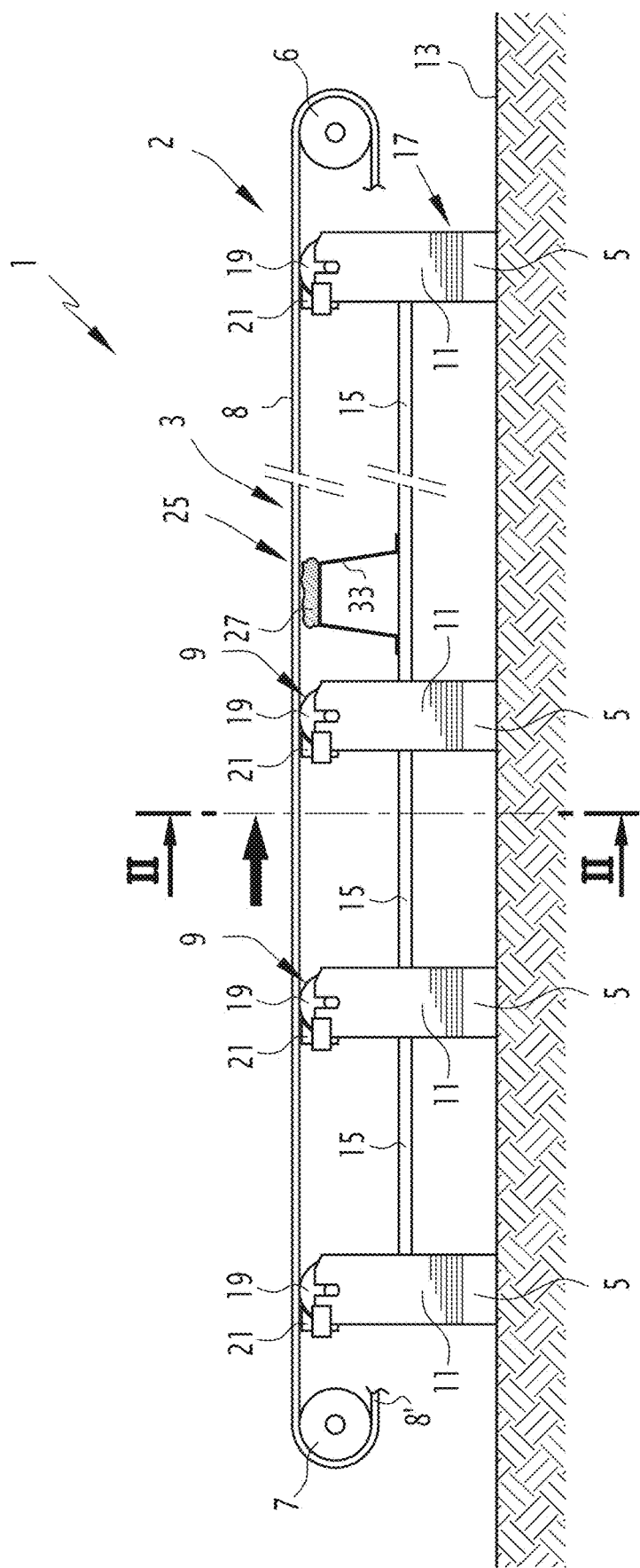
FIG. 1 is a schematic profile illustration of an assembly according to the invention, the inflatable pad being in the deflated state.

The assembly 1 shown in FIG. 1 comprises a belt conveyor 2.

This conveyor is typically intended to transport divided materials, for example sand or ores from a mine.

The conveyor belt 2 includes a longitudinal conveyor belt 3 and a plurality of support stations 5 for the conveyor belt, distributed along the belt.

The conveyor belt 3 is folded in a loop and engaged at its ends around two switchback rollers 6, 7.

Typically, one of the two rollers is a driver to provide the driving of the belt 3.

The belt 3 is thus divided into an upper transport segment 8 and a lower return segment 8', which is only partially shown in FIG. 1.

The stations 5 support the belt along the upper segment 8, and also along the lower segment 8'.

Figure 2:
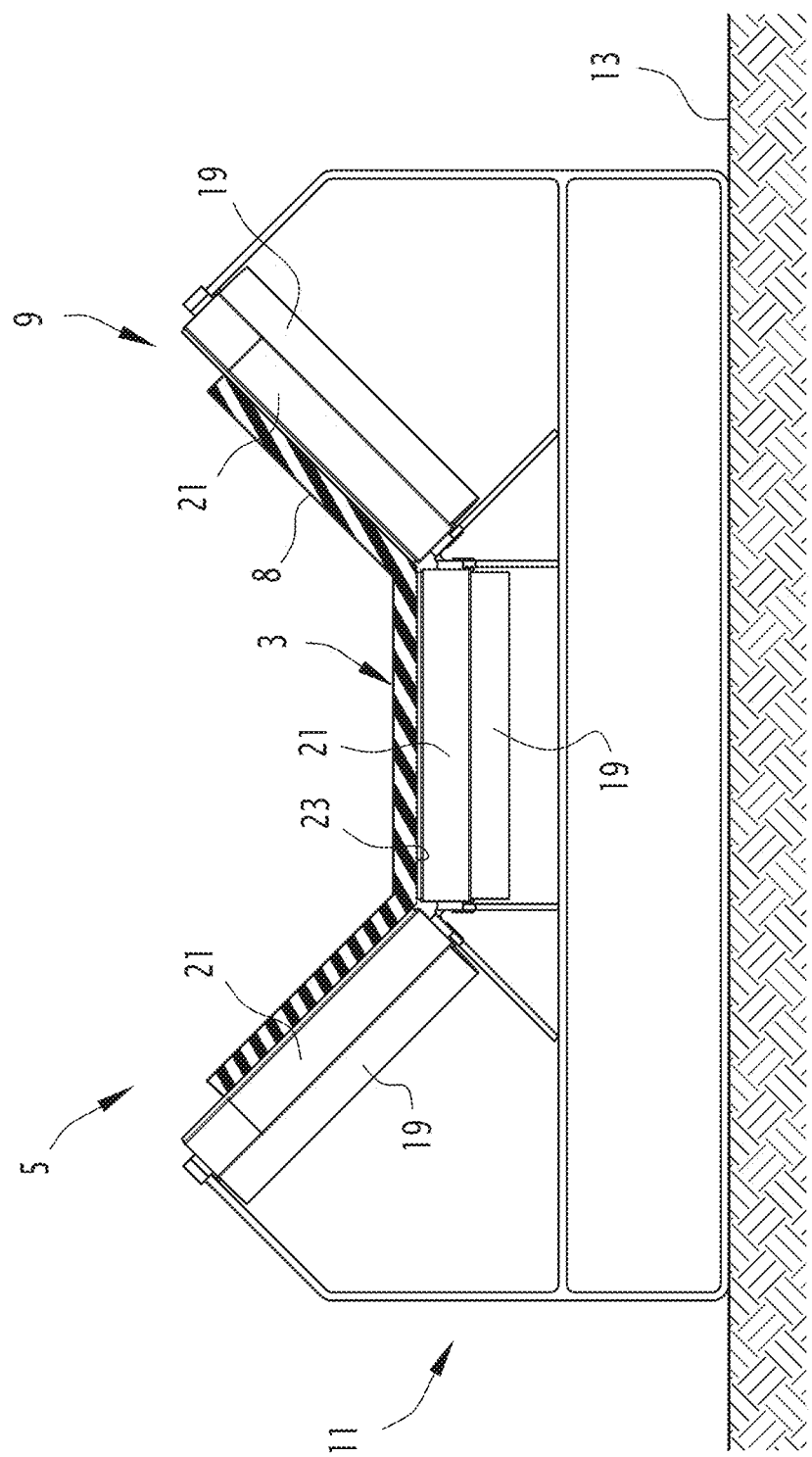
FIG. 2 is a front view of one of the support stations of FIG. 1.

Each support station 5 comprises a cradle 9 on which the conveyor belt 3 rests (see FIG. 2). It also includes a support chassis 11, by means of which the station 5 rests on the ground. For example, the chasses 11 of the different support stations 5 are structurally connected to one another by connecting structures 15, as shown in FIG. 1. The chasses 11 and the connecting structures 15 make up the chassis 17 of the conveyor.

The cradle 9 comprises a plurality of support members 19, mounted on the support chassis 11.

The support members 19 are typically rollers mounted rotating on the support chassis 11, or pads that are stationary relative to the support chassis 11.

In the case of rollers, anti-jamming protections 21, visible in FIG. 2, hide the so-called reentrant angle formed by the belt 3 and the support rollers 19.

The conveyor belt rests on the cradle 9 of the support station by a support surface 23, typically facing downward.

The cradle 9 is provided both to support the conveyor belt 3 and to give it a determined shape, for example a deep trough shape of the type shown in FIG. 2.

To that end, in the illustrated example, the support station includes three support members 19, arranged transversely next to one another. The central support member 19 is substantially horizontal. The other two support members 19 are inclined toward the central support member.

Thus, the support surface 23 has a determined shape in cross-section when the conveyor belt 3 rests on the cradle 9.

This shape is close to the shape of the cradle 9.

The assembly 1 also includes a maintenance device 25, intended to facilitate the maintenance of the belt conveyor. This device 25 is shown schematically in FIGS. 1 and 3, and in more detail in FIGS. 4 and 5.

The maintenance device 25 includes:
an inflatable pad 27 capable of selectively adopting an inflated state and a deflated state;
an inflation member 29, arranged so as to inflate the inflatable pad 27 to its inflated state.

Figure 3:
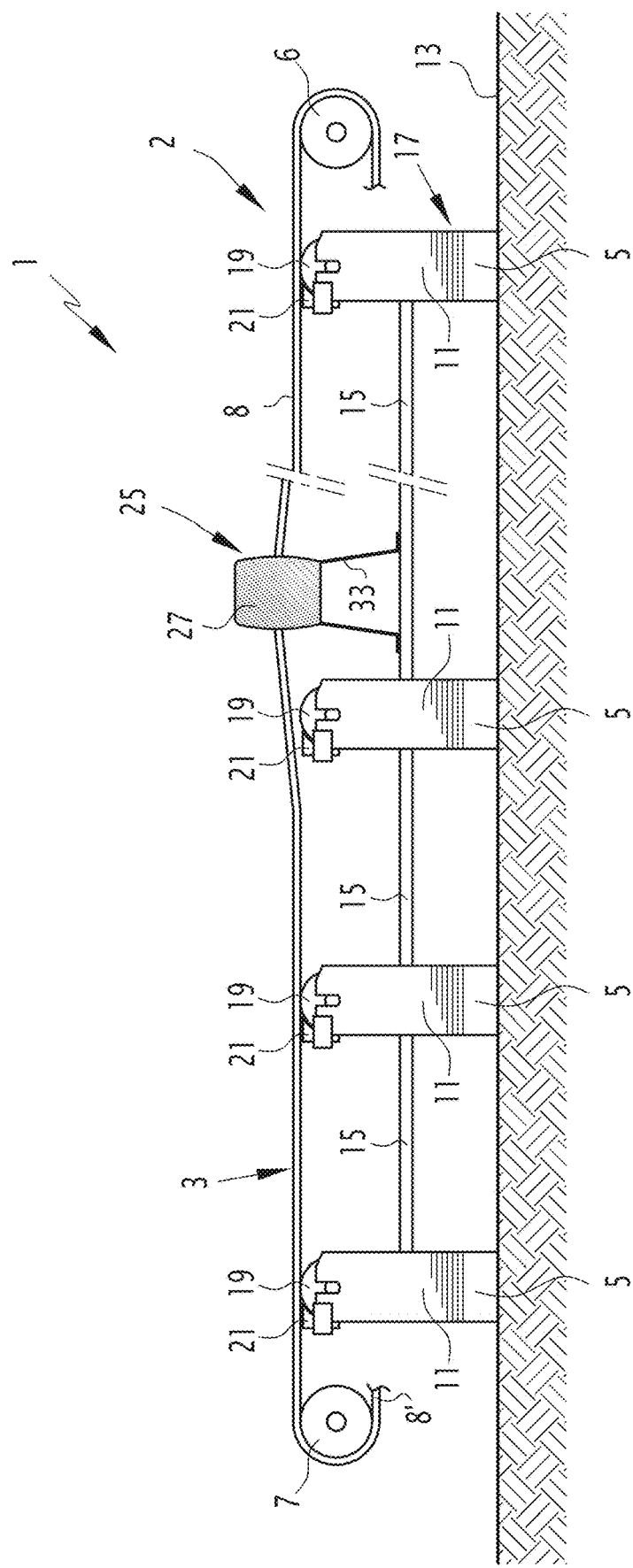
FIG. 3 is a view similar to that of FIG. 1, the inflatable pad being in its inflated state.
Figure 5:
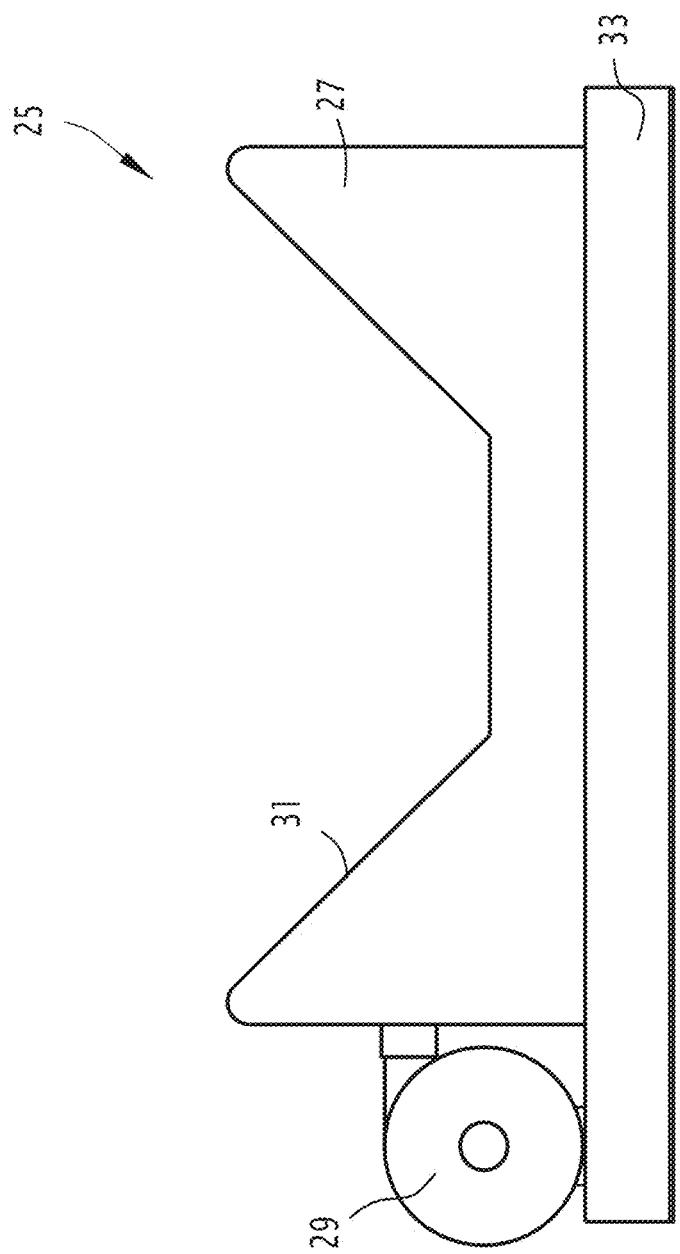
FIGS. 4 and 5 are side and front views of the maintenance device of FIG. 1, the inflatable pad being shown in the inflated state.
Figure 4:
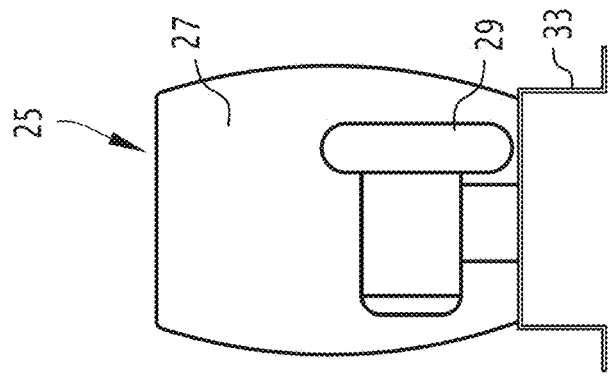

The pad 27 is shown in the deflated state in FIG. 1, and in the inflated state in FIGS. 3, 4 and 5.

The inflatable pad 27 is an airtight pouch. It is made from any appropriate flexible material, for example natural or synthetic rubber, polyurethane, or a coated and/or tight fabric.

In the deflated state, the pad 27 is in the form of a thin wafer, as illustrated in FIG. 1.

Thus, the inflatable pad 27 is configured in order, in the inflated state, to be inserted below the belt 3 in a lifting position, near one of the support stations 5, as shown in FIG. 1.

Furthermore, the inflatable pad 27 is configured in order, in the lifting position and in the inflated state, to lift the conveyor belt 3 such that the conveyor belt 3 rests directly on the inflatable pad 27 and no longer rests on the cradle 9 of the support station 5. Such a situation is illustrated in FIG. 3.

To that end, the inflatable pad has a bearing surface 29 provided to bear against the conveyor belt 3 in the inflated state. Advantageously, the bearing surface 31, in the inflated state and in the absence of stress, has, in cross-section, the same determined shape as the support surface 23 of the conveyor belt 3.

In the illustrated example, the bearing surface 31 has a deep trough shape. "Cross-section in the absence of stress" here means the section of the bearing surface 31 when no outside force is applied to the inflatable pad 27, the shape of the bearing surface 31 resulting solely from the pressure inside the inflatable pad 27, this pressure being nominal.

Because the support surface 23 of the belt 3 and the bearing surface 31 of the inflatable pad 27 have the same cross-section, the inflatable pad 27 adapts easily below the belt 3, and can lift the latter without excessive burden, since the force applied to the inflatable pad 27 does not cause a pronounced deformation of the belt.

Thus, in the invention, the bearing surface 31 adopts the same cross-section as the support surface 23 only under the effect of the inflation. No mechanical action is necessary.

The inflation member 29 is typically a fan. In a variant, the inflation member is an electric pump, a blower, a manual pump, or any other device making it possible to inject a fluid into the inflatable pad.

The use of a fan is particularly advantageous, since such equipment is inexpensive and light. A compressor could also be used if it is necessary to reach high pressures inside the inflatable pad. However, this type of equipment is heavier than a fan and more expensive.

The inflatable pad 27, in the inflated state, has a pressure of between one absolute bar and three absolute bars. Here, this is the inner pressure of the inflatable pad 27.

The bearing surface 31 extends over the entire transverse width of the belt. Longitudinally, it extends over a width of between 10 cm and 1 m.

The maintenance device 25 also includes a chassis 33 on which the inflatable pad 27 and the inflation member 29 are mounted.

For example, a lower face 35 of the inflatable pad, opposite the bearing surface 31, is adhered to the chassis 33.

The inflation member 29 is rigidly fastened to the chassis 33 by any appropriate means.

The chassis 33 is for example an Omega-shaped metal profile, of the type shown in FIGS. 3 and 4.

In a variant, it is of any other type.

Advantageously, the maintenance device 25 is provided to be mounted on the chassis 17 of the belt conveyor when it is placed in the lifting position, as illustrated in FIG. 1 and in FIG. 3.

The invention also relates to a maintenance process for a belt conveyor 2 comprising a longitudinal conveyor belt 3 and a plurality of support stations 5 for the conveyor belt 3, distributed along the belt.

Thus, the maintenance process is provided for the belt conveyor described above.

It is in particular provided to be carried out with the maintenance device 25 described above.

The maintenance process comprises the following steps:
- inserting an inflatable pad 27 in a deflated state below the belt 3, in a lifting position near one of the support stations 5;
- inflating the inflatable pad 27 to an inflated state in which the conveyor belt 3 rests directly on the inflatable pad 27 and no longer rests on the cradle 9 of said support station 5;
- performing a maintenance operation on said support station 5;
- deflating the inflatable pad 27 to its deflated state.

The inflatable pad 27 is typically as described above relative to the assembly 1.

The inflatable pad 27 is inserted below the belt 3 such that the bearing surface 31 is immediately below the support surface 23 of the belt. It is oriented such that the inflatable pad 27, once in its inflated state, nests exactly on the support surface 23, since the support surface 23 and the bearing surface 31 have the same cross-section.

The inflatable pad 27 is mounted on the conveyor chassis 17 in the lifting position.

The inflatable pad 27 is inflated by an inflation member 29, as described relative to the assembly 1. This member 29 is typically a fan.

The lifting position is chosen to be close enough to the support station 5 so that, when the inflatable pad 27 is inflated, the conveyor belt 3 is lifted above the cradle 9 and no longer rests on the latter.

Such a situation is illustrated in FIG. 3.

In the inflation step, the inflation member 29 is triggered and sends air inside the inflatable pad 27. The latter goes gradually from its deflated state to its inflated state.

The inflatable pad 27 and the fan 29 are mounted on a chassis 33, as described above.

They thus advantageously form a single-piece portable subassembly.

They rest on the conveyor chassis 17 by means of the chassis 33.

At the end of the inflation step, the inflatable pad has a pressure of between one absolute bar and three absolute bars.

The inflatable pad 27 is kept in an inflated step throughout the entire maintenance step on the support station 5. The operators therefore have easy access to the support station and are not bothered by the belt 3.

The maintenance step typically comprises a replacement operation of one or several support members 19. It can comprise other operations, for example procedures on other elements of the cradle 9 or on the chassis 11.

After the end of the maintenance step, the inflatable pad 27 is deflated to its deflated state. This next makes it possible to extract the inflatable pad from its lifting position.

The maintenance device can next be transported to other points of the belt conveyor, to perform other maintenance operations.

The conveyor belt 3 is stopped, i.e., immobile, during the steps that have been described above.

The invention has been described above with a pad inflated by air. In a variant, the pad is inflated with another gas. According to another variant, the pad is inflated by a liquid such as water.

The invention has been described with an inflatable pad whereof the bearing surface has the same cross-section as the support surface of the belt. In a variant, the bearing surface has another shape. For example, it is in the shape of a transverse tubular bead, or other suitable shapes.

Figure 6:
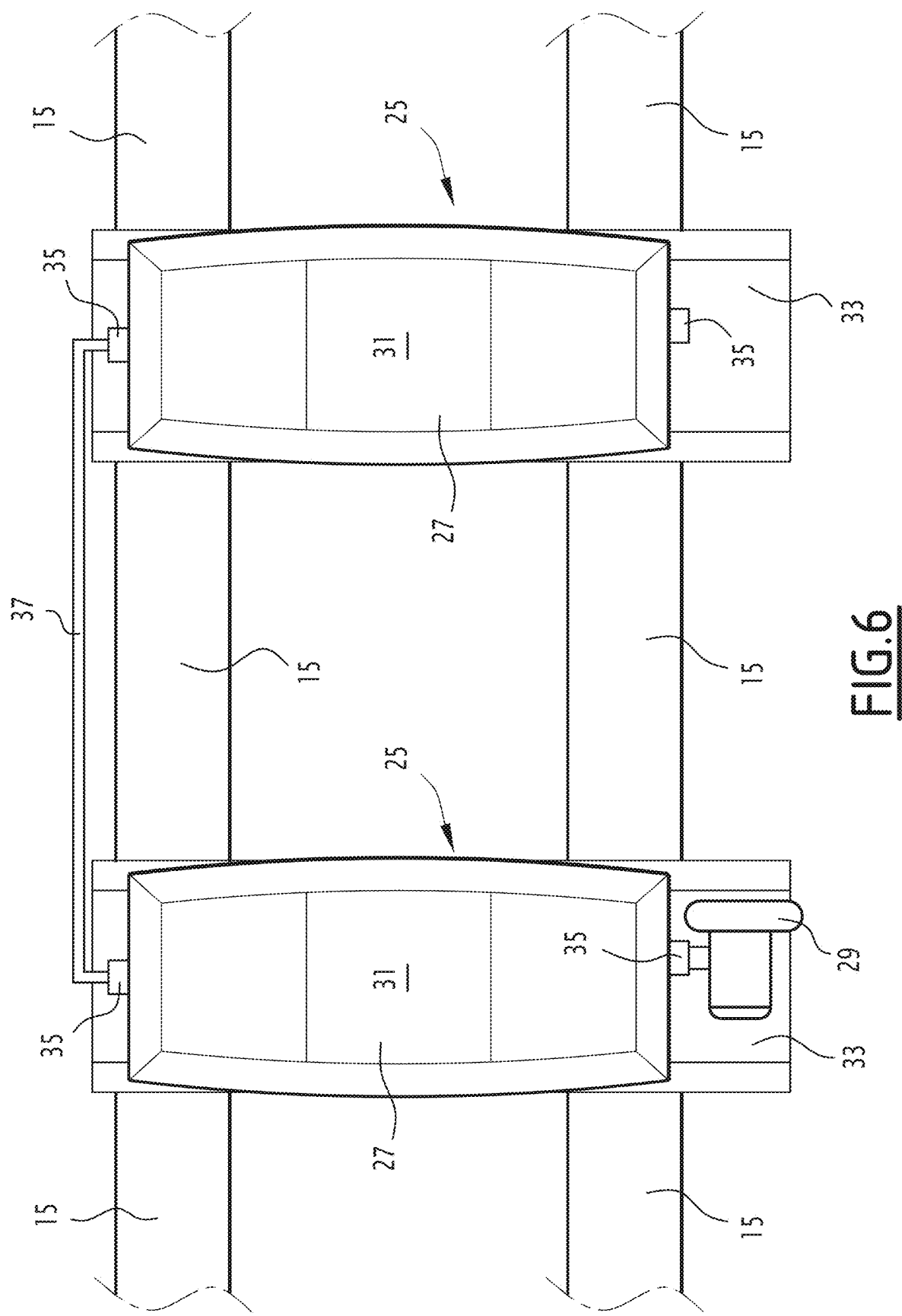
FIG. 6 is a view similar to that of FIG. 5, for an embodiment variant of the invention.

According to an embodiment variant illustrated in FIG. 6, the maintenance device 25 comprises two inflatable pads 27.

These pads 27 are preferably identical to one another and are oriented in the same way.

The two inflatable pads 27 are mounted on two independent chasses 33. In a variant, they are mounted on the same chassis 33.

The two pads 27 each have two orifices 35 placing the inner volume of the pad in communication with the outside.

The orifice 35 of a first of the two pads 27 is fluidly connected to one of the orifices 35 of the second pad 27 by a pipe 37. The pipe 37 is preferably removable. The other orifice 35 of the first pad is connected to the discharge of the inflation member 29. The other orifice 35 of the second pad 27 is closed off by a stopper, not shown.

Thus, when the pipe 37 is connected on the orifices 35, the inflation member 29 makes it possible to inflate both pads 27 at once.

The two pads 27 are arranged so as to be able to be placed on either side of a support station 5, in the deflated state, in respective lifting positions. In the inflated state of the two inflatable pads 27, the conveyor belt 3 rests directly on the two inflatable pads 27 and no longer rests on the cradle 9 of the support station 5.

Such an arrangement is particularly suitable for very heavy conveyor belts, or for a belt conveyor stopped with a load, i.e., with products on the conveyor belt.

It also makes it possible to provide very fast maintenance, since the cradle 9 of the support station 5 is indeed freed and accessible when the belt is lifted on both sides.

In a variant, several pads 27 are placed on each side of the support station 5, for example two pads on each side, or three pads, or more than three pads.

In a variant, several pads 27 are placed next to several consecutive support stations 5, for example one or more pads per station for two or more support stations 5. This allows the simultaneous maintenance of two or more support stations, once the pads are inflated.

All of the pads 27 are fluidly connected to one another as described in reference to FIG. 6, by pipes 37. A single inflation member 29 makes it possible to inflate all of the pads 27 at once.

Alternatively, all of the pads 27 placed on a same side of the support station 5 are fluidly connected to one another as described in reference to FIG. 6, by pipes 37. Two inflation members 29 are sufficient to inflate all of the pads 27.

What is claimed is:

1. A belt conveyor maintenance process comprising a longitudinal conveyor belt and a plurality of support stations for the conveyor belt distributed along the conveyor belt, each support station comprising a cradle on which the conveyor belt rests, the process comprising the following steps:
    inserting an inflatable pad in a deflated state below the conveyor belt, in a lifting position near one of the support stations;
    inflating the inflatable pad to a maintenance state in which the conveyor belt rests directly on the inflatable pad and no longer rests on the cradle of said support station;
    performing a maintenance operation on said support station; and
    deflating the inflatable pad to its deflated state,
    wherein the conveyor belt rests on the cradle of said support station by a support surface, said support surface having, in cross-section, a determined shape when the conveyor belt rests on the cradle of said support station, and
    the inflatable pad comprises a bearing surface to bear against the conveyor belt in the maintenance state, said bearing surface having, in cross-section, the determined shape in the absence of any stress, and being in the in the maintenance state solely from the pressure inside the inflatable pad.

2. The maintenance process according to claim 1, wherein the cradle comprises several support members of the conveyor belt, the maintenance operation comprising the replacement of at least one of the support members.

3. The maintenance process according to claim 1, wherein the inflatable pad is inflated by a fan.

4. The maintenance process according to claim 3, wherein the inflatable pad and the fan are mounted on a chassis and thus form a single-piece portable subassembly.

5. The maintenance process according to claim 1, wherein the inflatable pad, in the maintenance state, has a pressure of between 1 absolute bar and 3 absolute bars.

6. The maintenance process according to claim 1, wherein the conveyor belt comprises a conveyor chassis, the inflatable pad being mounted on the conveyor chassis in the lifting position.

7. The maintenance process according to claim 1, wherein the bearing surface adopts, in the maintenance state, said determined shape only under an effect of the inflation of the pad.

8. The maintenance process according to claim 1, wherein the inflatable pad is secured to a chassis, said chassis being a rigid structure which does not include means for displacing the inflatable pad.

9. A belt conveyor maintenance device comprising a longitudinal conveyor belt and a plurality of support stations for the conveyor belt distributed along the conveyor belt, each support station comprising a cradle on which the conveyor belt rests, the device comprising:
    an inflatable pad capable of selectively adopting a deflated state and a maintenance state, the inflatable pad being configured in order, in the maintenance state, to be inserted below the conveyor belt in a lifting position near one of the support stations; and
    an inflation member, arranged so as to inflate the inflatable pad to the maintenance state, the inflatable pad being configured in order, in the lifting position and in the maintenance state, to lift the conveyor belt such that the conveyor belt rests directly on the inflatable pad and no longer rests on the cradle of said support station,
    wherein the conveyor belt rests on the cradle of said support station by a support surface, said support surface having, in cross-section, a determined shape when the conveyor belt rests on the cradle of said support station, and
    the inflatable pad comprises a bearing surface to bear against the conveyor belt in the maintenance state, said bearing surface having, in cross-section, the determined shape in the absence of any stress, and being in the in the maintenance state solely from the pressure inside the inflatable pad.

10. The maintenance device according to claim 9, wherein the maintenance device comprises a chassis on which the inflatable pad and the inflation member are mounted, thus forming a single-piece portable subassembly.

11. An assembly, comprising:
    a belt conveyor comprising a longitudinal conveyor belt and a plurality of support stations for the conveyor belt distributed along the conveyor belt, each support station comprising a cradle on which the conveyor belt rests; and
    a maintenance device according to claim 8 configured for maintenance of the longitudinal conveyor belt.

12. The maintenance device according to claim 9, wherein the bearing surface adopts, in the maintenance state, said determined shape only under an effect of the inflation of the pad.

13. The maintenance device according to claim 9, wherein the inflatable pad is secured to a chassis, said chassis being a rigid structure which does not include means for displacing the inflatable pad.

* * * * *